US009123339B1

(12) United States Patent
Shaw et al.

(10) Patent No.: US 9,123,339 B1
(45) Date of Patent: Sep. 1, 2015

(54) SPEECH RECOGNITION USING REPEATED UTTERANCES

(75) Inventors: Hayden Shaw, Palo Alto, CA (US); Trausti Kristjansson, Hartsdale, NY (US); Andrew W. Senior, New York, NY (US)

(73) Assignee: Google Inc., Mountain View, CA (US)

( * ) Notice: Subject to any disclaimer, the term of this patent is extended or adjusted under 35 U.S.C. 154(b) by 1124 days.

(21) Appl. No.: 12/953,344

(22) Filed: Nov. 23, 2010

(51) Int. Cl.
*G10L 15/22* (2006.01)

(52) U.S. Cl.
CPC ...................... *G10L 15/22* (2013.01)

(58) Field of Classification Search
CPC ........................................... G10L 15/22
USPC ................. 704/251, 254, 256, 270
See application file for complete search history.

(56) References Cited

U.S. PATENT DOCUMENTS

| | | | |
|---|---|---|---|
| 4,328,562 A | 5/1982 | Hashimoto et al. | |
| 4,866,778 A | 9/1989 | Baker | |
| 5,027,406 A | 6/1991 | Roberts et al. | |
| 5,500,920 A | 3/1996 | Kupiec | |
| 5,510,981 A | 4/1996 | Berger et al. | |
| 5,712,957 A | 1/1998 | Waibel et al. | |
| 5,737,724 A | 4/1998 | Atal et al. | |
| 5,794,189 A * | 8/1998 | Gould | 704/231 |
| 5,855,000 A * | 12/1998 | Waibel et al. | 704/235 |
| 6,070,140 A | 5/2000 | Tran | |
| 6,195,635 B1 * | 2/2001 | Wright | 704/231 |
| 6,219,640 B1 | 4/2001 | Basu et al. | |
| 6,374,221 B1 | 4/2002 | Haimi-Cohen | |
| 6,397,180 B1 | 5/2002 | Jaramillo et al. | |
| 6,490,561 B1 | 12/2002 | Wilson et al. | |
| 6,513,005 B1 * | 1/2003 | Qin et al. | 704/254 |
| 6,922,669 B2 | 7/2005 | Schalk et al. | |
| 7,085,716 B1 * | 8/2006 | Even et al. | 704/235 |
| 7,366,668 B1 | 4/2008 | Franz et al. | |
| 7,565,282 B2 * | 7/2009 | Carus et al. | 704/9 |
| 7,689,420 B2 | 3/2010 | Paek et al. | |

(Continued)

OTHER PUBLICATIONS

Frey, B., et al., "ALGONQUIN: Iterating Laplace's Method to Remove Multiple Types of Acoustic Distortion for Robust Speech Recognition", EUROSPEECH 2001 Scandinavia, 7th European Conference on Speech Communication and Technology, Aalborg, Denmark, Sep. 3-7, 2001, [online] research.microsoft.com [retrieved on Nov. 23, 2010]. Retrieved from the Internet: <URL: http://research.microsoft.com/pubs/76516/2001-frey-eurospeech.pfd>, 4 pages.

(Continued)

*Primary Examiner* — Jialong He

(74) *Attorney, Agent, or Firm* — Fish & Richardson P.C.

(57) ABSTRACT

Subject matter described in this specification can be embodied in methods, computer program products and systems relating to speech-to-text conversion. A first spoken input is received from a user of an electronic device (an "original utterance"). Based on the original utterance, a first set of character string candidates are determined that each represent the original utterance converted to textual characters and a selection of one or more of the character string candidates are provided in a format for display to the user. A second spoken input is received from the user and a determination is made that the second spoken input is a repeat utterance of the original utterance. Based on this determination and using the original utterance and the repeat utterance, a second set of character string candidates is determined.

23 Claims, 5 Drawing Sheets

(56) References Cited

U.S. PATENT DOCUMENTS

| | | | |
|---|---|---|---|
| 7,756,710 B2* | 7/2010 | Franco et al. | 704/255 |
| 7,840,407 B2 | 11/2010 | Strope et al. | |
| 7,890,326 B2 | 2/2011 | Strope et al. | |
| 7,949,533 B2* | 5/2011 | Braho et al. | 704/270 |
| 2002/0111990 A1 | 8/2002 | Wood et al. | |
| 2002/0138265 A1* | 9/2002 | Stevens et al. | 704/251 |
| 2003/0216912 A1 | 11/2003 | Chino | |
| 2003/0229497 A1* | 12/2003 | Wilson et al. | 704/270.1 |
| 2004/0249637 A1* | 12/2004 | Baker | 704/239 |
| 2005/0256710 A1 | 11/2005 | Pankert et al. | |
| 2006/0041427 A1 | 2/2006 | Yegnanarayanan et al. | |
| 2006/0085186 A1* | 4/2006 | Ma et al. | 704/240 |
| 2006/0095268 A1 | 5/2006 | Yano et al. | |
| 2006/0149551 A1* | 7/2006 | Ganong et al. | 704/270.1 |
| 2006/0215821 A1 | 9/2006 | Rokusek et al. | |
| 2006/0293889 A1* | 12/2006 | Kiss et al. | 704/235 |
| 2007/0094022 A1* | 4/2007 | Koo et al. | 704/251 |
| 2007/0136060 A1 | 6/2007 | Hennecke et al. | |
| 2007/0233482 A1 | 10/2007 | Lee et al. | |
| 2008/0059167 A1 | 3/2008 | Poultney et al. | |
| 2008/0126091 A1* | 5/2008 | Clark et al. | 704/246 |
| 2008/0235017 A1 | 9/2008 | Satomura | |
| 2008/0243507 A1* | 10/2008 | Gopinath et al. | 704/257 |
| 2009/0271189 A1 | 10/2009 | Agapi et al. | |
| 2009/0306995 A1 | 12/2009 | Weng et al. | |
| 2009/0313016 A1* | 12/2009 | Cevik et al. | 704/241 |
| 2010/0004930 A1 | 1/2010 | Strope et al. | |
| 2010/0076765 A1 | 3/2010 | Zweig et al. | |
| 2011/0112837 A1 | 5/2011 | Kurki-Suonio et al. | |
| 2011/0161079 A1 | 6/2011 | Gruhn et al. | |

OTHER PUBLICATIONS

Kristjansson, T., et al., "Super-Human Multi-Talker Speech Recognition: The IBM 2006 Speech Separation Challenge System", INTERSPEECH 2006: ICSLP; Proceedings of the Ninth International Conference on Spoken Language Process, Sep. 17-21, 2006, Pittsburgh, Pennsylvania, USA, Bonn, ISCA, 2006, 4 pages.

Zweig, G., "New Methods for the Analysis of Repeated Utterances", INTERSPEECH 2009, 10th Annual Conference of the International Speech Communication Association, Brighton, United Kingdom, Sep. 6-10, 2009, 4 pages.

Zweig, G., et al., "Structured Models for Joint Decoding of Repeated Utterances", INTERSPEECH 2008, 9th Annual Conference of the International Speech Communication Association, Brisbane, Australia, Sep. 22-26, 2008, 4 pages.

* cited by examiner

SPEECH RECOGNITION USING REPEATED UTTERANCES

TECHNICAL FIELD

This document relates to systems and techniques for recognizing words from speech input.

BACKGROUND

Computer users employ a number of mechanisms to provide input to their computing devices. Keyboards are common input devices, and they typically include single-digit numbers (e.g., in a cellular telephone), each of the letters in the alphabet, and some non-alphanumeric characters (e.g., in Qwerty or Dvorak keyboards). On mobile devices, keyboards are frequently "virtual" in form, and are displayed on a touch screen of a device. Users of computer devices, and particularly of mobile computing devices, may be constrained in their use of a keyboard. For example, the keyboard itself may be constrained in size because mobile device displays are small, so that only a sub-set of relevant characters can be displayed or the keys may be too small to press accurately. Also, the user may be constrained, in that they cannot easily type on a keyboard while walking through a crowded airport or driving a car. In such situations, spoken input may be preferred over typed input. However, speech-to-text conversion or translation typically requires lots of computer processing power, and mobile devices typically do not have much processing power. Also, such conversion often requires a particular user to "train" the system so that it better understands the user's voice and speech patterns.

SUMMARY

This document describes systems and techniques for recognizing spoken input into an electronic device. In general, a system may provide for speech-to-text conversion of spoken (uttered) inputs from a user, though at times a user may repeat an utterance, such as when a system does not recognize an initial utterance from the user and prompts the user to repeat the utterance, when the system provides the user with a list of strings that it thinks matches the utterance and the user indicates that none of the strings is a match, or simply when the user repeats the utterance on his or her own. Where two utterances are provided, the system may select candidate character strings (e.g., words or phrases) for each of the received utterances, may determine that the utterances match each other (e.g., because two utterances in a row sound very much alike or because the second utterance was received in response to the system prompting the user to repeat the first utterance) and may select a candidate string or strings based on the combination of the two utterances, such as by identifying strings that are determined to match both utterances, or if the user indicated that no strings from the first utterance were a match, by selecting strings that were identified for only the second utterance and not the first.

In general, in one aspect, the subject matter described in this specification can be embodied in methods relating to speech-to-text conversion. A first spoken input is received from a user of an electronic device where the first spoken input is an original utterance by the user. Based on the original utterance, a first set of character string candidates are determined, wherein each character string candidate represents the first spoken input converted to textual characters. A selection of one or more of the character string candidates are provided in a format for display to the user, in response to receiving the first spoken input. A second spoken input is received from the user. A determination is made that the second spoken input is a repeat utterance of the original utterance. Based on determining that the second spoken input is a repeat utterance of the original utterance, and using the original utterance and the repeat utterance, a second set of character string candidates is determined. Character string candidates in the second set can represent a text conversion of the original, repeat utterance or some combination thereof. Other embodiments of this aspect include corresponding systems, apparatus, and computer programs recorded on computer storage devices, each configured to perform the actions of the methods.

These and other embodiments can each optionally include one or more of the following features, alone or in combination. Determining that the second spoken input is a repeat utterance of the original utterance can include determining that the first and second spoken inputs were received within a predetermined time period of each other.

Determining that the second spoken input is a repeat utterance of the original utterance can include generating a score that indicates an acoustic alignment between a first sequence of vectors that represents the first spoken input and a second sequence of vectors that represents the second spoken input and determining that the score exceeds a predetermined threshold score. Determining that the second spoken input is a repeat utterance of the original utterance can include determining that the second spoken input is received in response to a request to the user to repeat the original utterance.

Determining a first set of character string candidates can include using a speech recognizer to determine the character string candidates and a first set of probabilities, wherein each probability corresponds to a character string candidate. A second set of character string candidates can be determined based on the original utterance and the repeat utterance, including using the speech recognizer to determine a second set of character string candidates and a corresponding second set of probabilities. Each probability can correspond to one of the character strings. For character string candidates that are included in both the first set of character string candidates and the second set of character string candidates, the corresponding probabilities for the character string candidates from the first set of probabilities and the second set of probabilities can be combined to determine a combined probability. The second set of character string candidates can be ranked based on the combined probabilities to determine the second set of character string candidates. Combining the corresponding probabilities can include weighting the probability from the first set of probabilities and the probability from the second set of probabilities differently when combining the probabilities.

Determining a first set of character string candidates can include using a speech recognizer to determine a first word lattice that represents the character string candidates and a first set of probabilities, wherein each probability corresponds to a character string candidate. Determining a second set of character string candidates based on the original utterance and the repeat utterance can include using the speech recognizer to determine a second word lattice that represents a second set of character string candidates and a second set of probabilities, wherein each probability corresponds to a character string candidate. An intersection or union of the first word lattice and the second word lattice can be determined and, for each character string candidate included in the intersection or union, a combined probability can be determined that is based on the probabilities from the first set of probabilities and the second set of probabilities that correspond to the character string candidate. The second set of character string candidates can be determined based on the intersection or union and the determined combined probabilities.

Determining the first word lattice and the second word lattice can include using Hidden Markov Modeling. Determining a combined probability can include weighting the probability from the first word lattice and the probability from the second word lattice differently when combining the probabilities.

Determining a first set of character string candidates can include using a speech recognizer and first language model to determine a first word lattice that represents the character string candidates and a first set of probabilities, wherein each probability corresponds to a character string candidate. Determining a second set of character string candidates based on the original utterance and the repeat utterance can include using the speech recognizer and a second language model to determine a second word lattice. The second language model includes the first word lattice. A second set of character string candidates and a second set of probabilities is determined from the second word lattice, wherein each probability corresponds to a character string candidate. The second set of character string candidates is ranked to determine a ranked second set of character string candidates.

The second set of text candidates can be ranked based on the second set of probabilities. The second set of text candidates can be ranked based on combined probabilities determined for character string candidates that are included in both the second set of text candidates and the first set of text candidates. The combined probabilities can be determined by weighting the probability from the first word lattice and the probability from the second word lattice differently when combining the probabilities.

Determining a second set of character string candidates based on the original utterance and the repeat utterance can include determining a first acoustic sequence of vectors that represents the original utterance and a second acoustic sequence of vectors that represents the repeat utterance. The first acoustic sequence of vectors and the second acoustic sequence of vectors can be aligned to each other. For each frame that aligns between the first acoustic sequence of vectors and the second acoustic sequence of vectors, a combined probability for the frame can be determined based on the original utterance and the repeat utterance. The second set of character string candidates can be determined based on the combined probabilities for aligned frames and probabilities based on the repeat utterance for non-aligned frames. Aligning the first acoustic sequence of vectors and the second acoustic sequence of vectors can include applying dynamic time warping.

Determining a second set of character string candidates based on the original utterance and the repeat utterance can include decoding the original utterance and the repeat utterance together using a multi-stream HMM (Hidden Markov Modeling) recognizer, wherein probabilities of character string candidates that are determined for both the original utterance and the repeat utterance are combined. Combining the probabilities for a character string candidate determined from both the original utterance and the repeat utterance can include detecting noise included in one or both of the utterances and weighting the probabilities based on the noise detected.

A character string that is in both the first set of character string candidates and the second set of character string candidates can be selected for provision to the electronic device. The selected character string can be determined to be a better match for one or more of the original and repeat utterances than other character strings that appear in the first and second set of character string candidates. A list of one or more character strings that are determined to be present in the first set of character string candidates and the second set of character string candidates can be transmitted to the electronic device for selection by the user. A list of one or more character strings that are determined to be present in the second set of character string candidates can be transmitted to the electronic device for selection by the user.

In general, in another aspect, the subject matter described in this specification can be embodied in methods relating to speech-to-text conversion. A first spoken input is received from a user (an "original utterance"). Based on the original utterance, a set of character string candidates is determined, wherein each character string candidate represents the first spoken input converted to text. A selection of one or more of the character string candidates is provided to the user in response to receiving the first spoken input. A second spoken input is received from the user, wherein the second spoken input is a repeat utterance of the original utterance. Based on the original utterance and the repeat utterance, a second set of character string candidates is determined. Character string candidates in the second set can represent a text conversion of the original, repeat utterance or some combination thereof. Other embodiments of this aspect include corresponding systems, apparatus, and computer programs recorded on computer storage devices, each configured to perform the actions of the methods.

In general, in another aspect, the subject matter described in this specification can be embodied in methods relating to speech-to-text conversion. A first spoken input is received from a user of an electronic device (an "original utterance"). Based on the original utterance, a first set of character string candidates and a confidence level corresponding to each character string candidate in the set is determined. Each character string candidate represents the first spoken input converted to text. That less than a threshold number of character string candidates in the set have a corresponding confidence level that meet or exceed a predetermined threshold level is determined, and in response to the determination, the user is requested to provide a second spoken input. The second spoken input is received from the user, wherein the second spoken input is a repeat utterance of the original utterance. Based on the original utterance and the repeat utterance, a second set of character string candidates is determined. Character string candidates in the second set can represent a text conversion of the original, repeat utterance or some combination thereof. A selection of one or more character string candidates from the second set of character string candidates is determined and transmitted to the electronic device for display to the user. Other embodiments of this aspect include corresponding systems, apparatus, and computer programs recorded on computer storage devices, each configured to perform the actions of the methods.

These and other embodiments can each optionally include one or more of the following features, alone or in combination. Determining a first set of character string candidates can include using a speech recognizer to determine the character string candidates and a first set of probabilities, wherein each probability corresponds to a character string candidate. Determining a second set of character string candidates based on the original utterance and the repeat utterance can include using the speech recognizer to determine a second set of character string candidates and a corresponding second set of probabilities, wherein each probability corresponds to one of the character strings. For character string candidates that are included in both the first set of character string candidates and the second set of character string candidates, the corresponding probabilities for the character string candidates from the first set of probabilities and the second set of probabilities can be combined to determine a combined probability. The second set of character string candidates can be ranked based on the combined probabilities to determine a ranked second set of character string candidates. Combining the corresponding probabilities can include weighting the probability from the first set of probabilities and the probability from the second set of probabilities differently when combining the probabilities. Determining a first set of character string candidates can include using a speech recognizer to determine a first word lattice that represents the character string candidates and a first set of probabilities, wherein each probability corresponds to a character string candidate. Determining a second set of character string candidates based on the original utterance and the repeat utterance can include using the speech recognizer to determine a second word lattice that represents a second set of character string candidates and a second set of probabilities, wherein each probability corresponds to a character string candidate. An intersection or union of the first word lattice and the second word lattice can be determined and, for each character string candidate included in the intersection or union, a combined probability based on the probabilities from the first set of probabilities and the second set of probabilities that correspond to the character string candidate can be determined. The second set of character string candidates can be determined based on the intersection or union and the determined combined probabilities.

Determining a first set of character string candidates can include sing a speech recognizer and first language model to determine a first word lattice that represents the character string candidates and a first set of probabilities, wherein each probability corresponds to a character string candidate. Determining a second set of character string candidates based on the original utterance and the repeat utterance can include using the speech recognizer and a second language model, wherein the second language model includes the first word lattice, to determine a second word lattice that represents a second set of character string candidates and a second set of probabilities, wherein each probability corresponds to a character string candidate. The second set of character string candidates can be ranked to determine a ranked second set of character string candidates.

Determining a second set of character string candidates based on the original utterance and the repeat utterance can include determining a first acoustic sequence of vectors that represents the original utterance and a second acoustic sequence of vectors that represents the repeat utterance. The first acoustic sequence of vectors and the second acoustic sequence of vectors can be aligned to each other. For each frame that aligns between the first acoustic sequence of vectors and the second acoustic sequence of vectors, a combined probability for the frame based on the original utterance and the repeat utterance can be determined. Based on the combined probabilities for aligned frames and probabilities based on the repeat utterance for non-aligned frames, the second set of character string candidates can be determined. Aligning the first acoustic sequence of vectors and the second acoustic sequence of vectors can include applying dynamic time warping.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
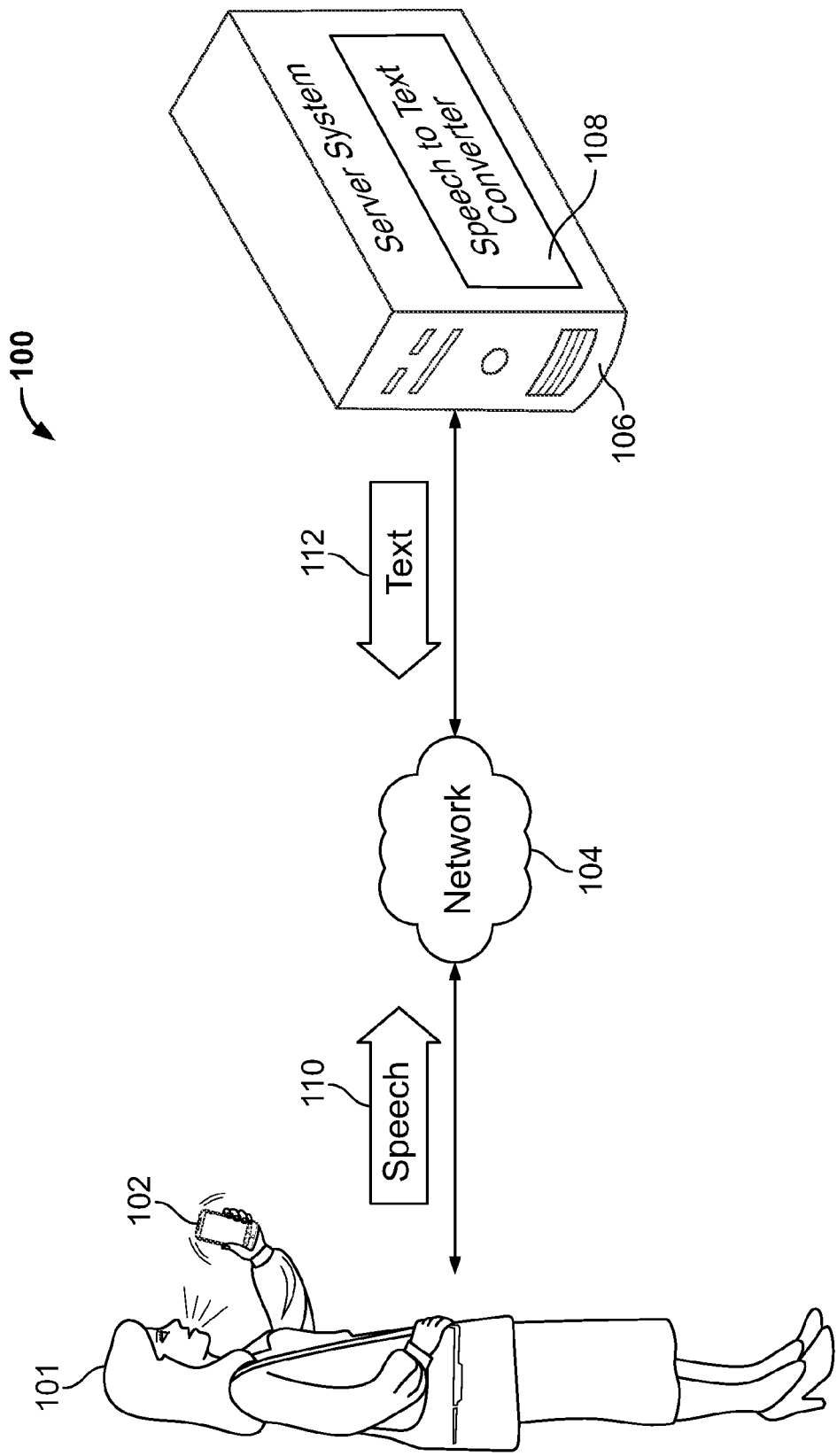
FIG. 1 is a schematic representation of an example system configured to receive speech input and to provide a text conversion.

FIG. 1 is a schematic representation of an example system 100 configured to receive speech input and to provide a text conversion of the input. The system 100 includes an electronic device 102 that has a microphone to receive spoken user input, and a server system 106 that is configured to convert the spoken user input into text. In this example, the electronic device 102 is a mobile electronic device (e.g., a smartphone computing device), though it should be understood that the electronic device 102 can be a different electronic device, e.g., a personal computer, laptop computer, PDA, etc. The electronic device 102 can include one or more other user input mechanisms, for example, a keyboard, which can include a soft or virtual keyboard (e.g., a touchscreen keyboard) or a hard or physical keyboard, a mouse, a trackball, and the like.

The electronic device 102 can pass a sound file (including streaming sound data) of the spoken input to a remote server system 106 over the network 104. The network 104 can include one or more local area networks (LANs), a wide area network (WAN), such as the internet, a wireless network, such as a cellular network, or a combination of all of the above.

User input can be received by the electronic device 102 for use as input into one of various applications that can execute on the electronic device 102, e.g., a web browser, an e-mail application, a word processing application, a contacts book, and/or a calendar. In some implementations, the user input is an input into a web form on a particular web page of a particular web site. Spoken input, i.e., a speech utterance 110, can be provided to the server system 106 for conversion to text, e.g., by a speech-to-text converter 108. The text 112, which can be a selected best candidate or can be a list of n-best candidates that correspond to the speech utterance, is provided back to the electronic device 102 over the network 104. The text 112 can be displayed to the user on a display of the electronic device 102. If the text 112 includes a list of n-best candidates, the user 101 can select a candidate from the list that corresponds to the user's spoken input, for example, by touching the touch screen over one of the candidates, to navigate the list and make a selection.

If the text 112 provided does not include a correct conversion of the speech utterance, e.g., if the selected candidate is the incorrect word or words or if the n-best candidate list fails to include the correct word or words, then the user 101 typically makes a second speech utterance that is the same word or words as his or her original utterance. The second speech utterance is referred to herein as a repeat utterance. This document describes techniques and systems that may be used to provide improved speech-to-text conversion when a repeat utterance is received from the user 101. In some instances the user will make additional repeat utterances (e.g., a third and fourth utterance) in an attempt to get the correct word or words in response to the speech-to-text conversion. It should be understood that the techniques described herein can be used when there are more than two utterances (i.e., more than one repeat utterance).

Figure 2:
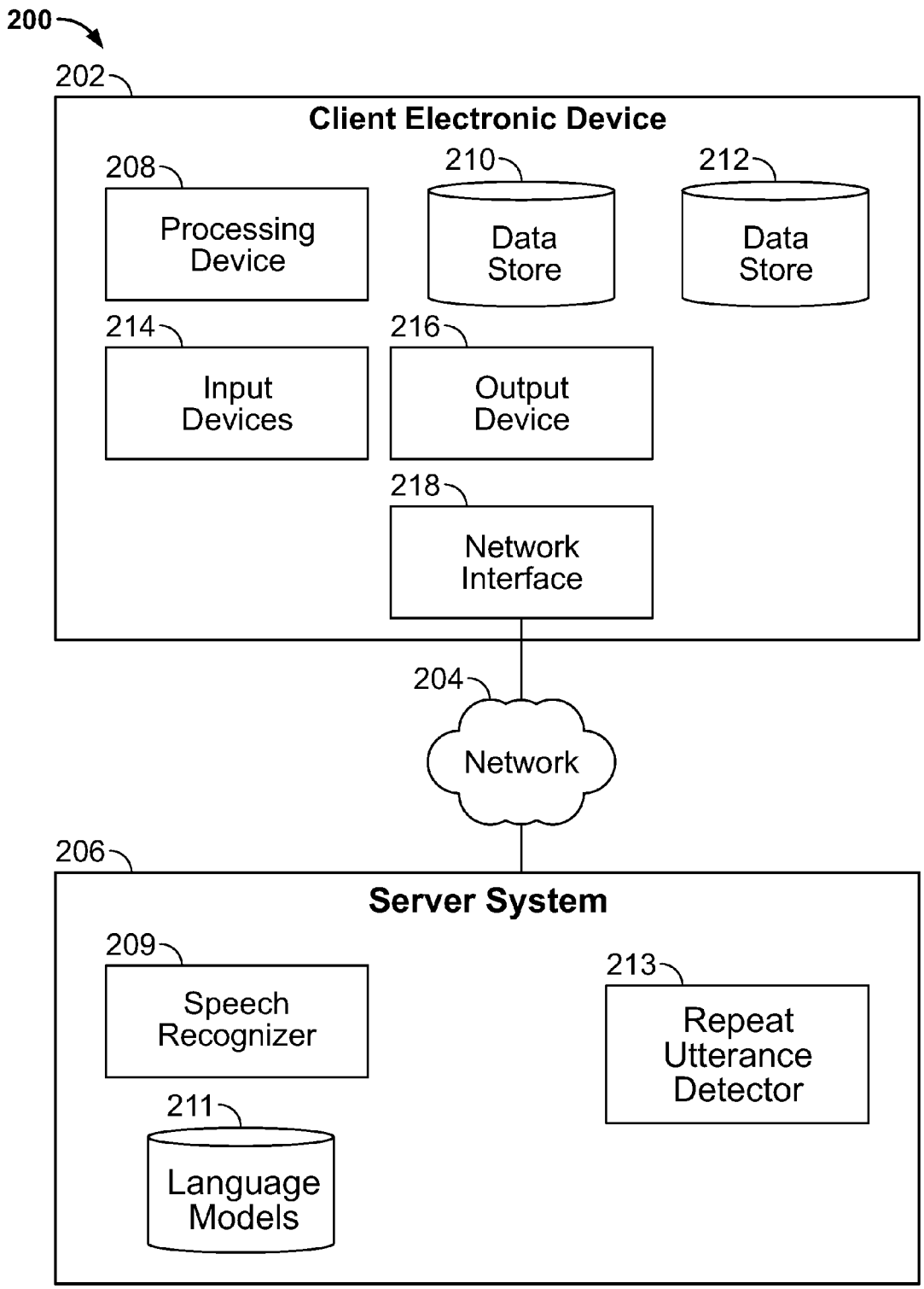
FIG. 2 is a block diagram of an example system including a client electronic device configured to receive speech input and a server system configured to determine a text conversion.

FIG. 2 is a block diagram of an example system 200 including a client electronic device 202 configured to receive speech input and a server system 206 configured to determine a text conversion. The system 200 can be used to implement improved speech-to-text conversion when one or more repeat utterances are received. The system 200 includes the client electronic device 202 that can communicate over a network 204 with the server system 206. The client electronic device 202 can be implemented, for example, in a computer device, such as a personal computer device, or other electronic devices, such as a mobile phone, mobile communication device, personal digital assistant (PDA), Global Positioning System (GPS) navigation device, and the like. The client electronic device 202 includes a processing device 208, a first data store 210, a second data store 212, input devices 214, output devices 216, and a network interface 218. A bus system (not shown) can include, for example, a data bus and a motherboard, and can be used to establish and control data communication between the components 208, 210, 212, 214 and 216. Other system architectures can also be used.

The processing device 208 can include, for example, one or more microprocessors. The first data store 210 can, for example, include a random access memory storage device, such as a dynamic random access memory, or other types of computer-readable medium memory devices. The second data store 212 can, for example, include one or more hard drives, a flash memory, and/or a read only memory, or other types of computer-readable medium memory devices.

The input devices 214 include at least one input device that is configured to receive spoken input (e.g., a microphone) and can include other input devices, for example, a keyboard (soft and/or hard), a touch screen, a mouse, a stylus, a trackball, a button, etc. Example output devices 216 can include a display device, an audio device, etc. The network interface 218 can, for example, include a wired or wireless network device operable to communicate data to and from a network 204. The network 204 can include one or more local area networks (LANs), a wide area network (WAN), such as the internet, a wireless network, such as a cellular network, or a combination of all of the above.

The server system 206 is configured to convert spoken user input to text and transmit the text to the client electronic device 202 over the network 204. In the example system 200 shown, the server system 206 is remote to the client electronic device 202. However, it should be understood that in some implementations, one or more of the components of the server system 206 configured to provide speech-to-text conversion can be implemented within the client electronic device 202 rather than at a remote server system.

The speech utterance and the repeated utterance, i.e., the spoken input, are transmitted to the server system 206 over the network 204. The server system 206 includes a speech recognizer 209 configured to determine a text conversion of the spoken input. The text conversion can be a best candidate for text corresponding to the spoken input or can be a list of n-best candidate selections for presentation to the user for selection as the input. In an example implementation, the speech recognizer can include Hidden Markov Modeling (HMM) encoded in a finite state transducer (FST). Other configurations of speech recognizer can be used by the server system 206. The speech recognizer 209 uses one or more language models, i.e., language models 211 when determining the text conversion. The language models 211 can include language models 211 tailored to particular applications, or webpages, or webforms on a particular webpage, or websites, to name a few examples. Each language model can, for example, define a particular rule set, e.g., grammar particular to a language, phrase sets, verbals, etc., that can be used to determine a user's likely intent in entering a set of inputs (e.g., inputs for generating candidates that are translations, transliterations, or other types of phonetic representations). In some implementations, some or all of the language models can also include a user history of a particular user, e.g., a dictionary of words and phrases often used by a particular user.

The server system 206 is configured to detect when a second utterance is a repeat utterance. For example, a repeat utterance detector 213 can be included in the server system 206 that is configured to detect a repeat utterance. The server system 206 is further configured, when a repeat utterance is detected, to use both the original utterance and the repeat utterance (or more than one repeat utterance) to determine the text conversion, as is described in further detail below.

Figure 3:
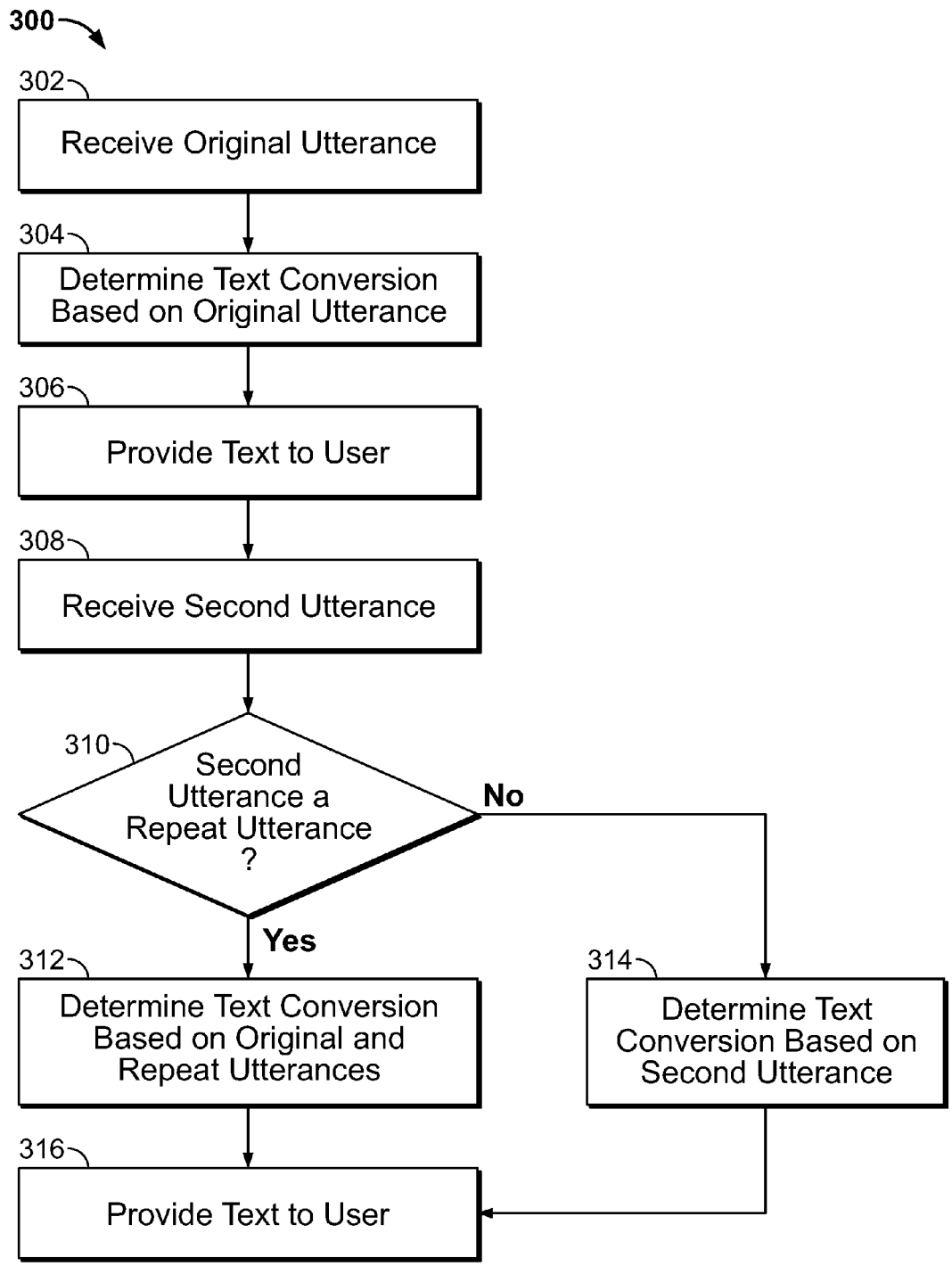
FIG. 3 is a flowchart showing an example process for converting speech to text using an original utterance and a repeat utterance.

FIG. 3 is a flowchart showing an example process 300 for converting speech to text using an original utterance and a repeat utterance. A first utterance, referred to as an "original utterance", is received (Box 302). By way of illustrative example, the process 300 can be described with reference to the system 200 shown in FIG. 2, although it should be understood that the process 300 can be implemented by a differently configured system. In this example, the original utterance can be input to an input device 214 to the client electronic device 202, transmitted over the network 204 and received by the server system 206.

A text conversion based on the original utterance is determined (Box 304). For example, the speech recognizer 209 can apply a language model selected from the language models 211 and determine a text conversion of the original utterance. The text conversion is provided (Box 306). For example, the text conversion can be provided by the server system 206 over the network 204 to the client electronic device 202 for presentation to a user of the client electronic device 202 on an output device 216, such as a display screen. The text conversion provided can be the top ranked character string determined by the speech recognizer 209 or can be a set of top-n ranked character strings.

A second utterance is received (Box 308). For example, the second utterance can be input to an input device 214 of the client electronic device 202, transmitted over the network 204 and received by the server system 206. A determination is made as to whether the second utterance is a repeat of the original utterance, i.e., a repeat utterance (Box 310). For example, the repeat utterance detector can be used to make the determination.

If the second utterance is determined to be a repeat utterance ("Yes" branch of Box 310), then a text conversion is determined based on the original utterance and the repeat utterance (Box 312). If the second utterance is determined not to be a repeat utterance, i.e., is a new utterance, then a text conversion is determined based on the second utterance alone (Box 314).

The text conversion is provided (Box 316). For example, the text conversion can be provided by the server system 206 over the network 204 to the client electronic device 202 for presentation to the user on an output device 216, such as a display screen. The text conversion provided can be the top ranked character string or can be a set of top-n ranked character strings.

Detecting a Repeat Utterance

If a user of the client electronic device 202 inputs a speech utterance (i.e., the "original utterance") and receives a text conversion in response (either the top ranked candidate or a selection of n-best candidates) and the correct text conversion is not included in the response, then the user typically repeats the utterance (i.e., the "repeat utterance"). As discussed above, the server system 206, e.g., using the repeat utterance detector 213, is configured to detect a repeat utterance, that is, to determine whether a second utterance is a repeat utterance or a new utterance. Various techniques can be used to determine whether a second utterance is a repeat utterance, that is, to implement the step in Box 310 of FIG. 3, some examples of which are discussed below.

In some implementations, if a second utterance is received within a predetermined time period after receiving the original utterance, then the second utterance is presumed to be a repeat utterance. As an illustrative example, the predetermined time period can be approximately 15 seconds. If the second utterance is received outside of the predetermined time period, i.e., too long afterward, then the second utterance is presumed to be a new utterance (e.g., a new query or relating to a different input field).

In some implementations, if the user performs an intervening action between the original utterance and a next utterance, then the next utterance is presumed to be a new utterance. For example, by selecting a candidate from the n-best list of candidates presented to the user in response to the original utterance, a next utterance received is presumed to be a new utterance, even if within the predetermined time period. In another example, in response to the speech input the server system automatically selects the best candidate, and then the best candidate is used as a basis to perform another action, e.g., a search. In this example, the user is presented a set of search results. If the user then acts to select a search result from the search results provided, any next utterance is also presumed to be a new utterance. The user's actions, in these examples, tends to suggest that the text conversion was accurate, or at least that the user was satisfied with the text conversion and/or results, and therefore a next utterance is probably a new utterance is not an attempt by the user to rearticulate the original utterance. Other types of intervening actions can also be used to detect whether a next utterance is a repeated utterance, and the examples provided are illustrative and non-limiting.

In some implementations, if the second utterance is detected to have been uttered by a different voice than the original utterance, then the second utterance is presumed to be a new utterance. In one example, a universal background model can be adapted to each utterance, and a statistical test or pattern classifier can be used to determine if the two adapted universal background models that correspond to the first and second utterances could have come from the same speaker. However, other techniques for speaker verification can be used.

In some implementations, acoustic alignment using dynamic programming can be used to detect whether a second utterance is a repeat of the original utterance. That is, the original utterance and the second utterance can be represented by acoustic sequences of vectors and an alignment score that indicates the alignment between the two sequences of vectors can be used to determine whether or not the second utterance is detected to be a repeat of the original utterance. A "poor" alignment score suggests the two utterances are different, and therefore the second utterance is not a repeat utterance. A "good" alignment score suggests the second utterance is a repeat of the original utterance, and a repeat utterance is therefore detected. Whether or not a score is "poor" or "good" can be determined empirically. For example, training data can be used that includes some pairs of acoustic sequences of vectors that are known to represent the same utterance (i.e., that includes a repeat utterance) and some pairs of acoustic sequences of vectors that are known to represent difference utterances (i.e., that do not include a repeat utterance). The alignment scores for the pairs of acoustic sequences of vectors can be used to determine a threshold score value, where scores exceeding the threshold are good and scores below the threshold are poor.

In some implementations, the user can be prompted to input a repeat utterance. For example, if the confidence level (described further below) of the text conversion of the original utterance is below a predetermined threshold, then the user can be requested to provide a second utterance. In another example, if the confidence level of less than a threshold number of character string candidates generated from the speech-to-text conversion of the original utterance is less than a predetermined threshold level, then the user can be requested to provide a second utterance. In some examples, the threshold number is one, i.e., if none of the character string candidates have the requisite predetermined confidence level, then the user is asked to repeat his or her utterance. In these implementations, the second utterance is "detected" as a repeat utterance because the second utterance is received in response to a prompt for a repeat. In some instances, in response to the prompt to input a repeat, the user may utter a different word or words than they originally spoke. Using the techniques described above for determining whether or not a second utterance is a repeat of an original utterance, it can be detected that even though the user was explicitly asked to provide a repeat, that the second utterance is actually not a repeat. In such instances, the second utterance can be given precedence in determining the speech-to-text conversion candidates. Whether the second utterance was provided in response to a prompt for a repeat can be given some weight when determining whether or not to treat the second utterance as a repeat utterance.

In some implementations, all of the above techniques for detecting a repeat utterance can be used and the results combined to generate the determination of whether a repeat utterance is detected. For example, the results can be combined in a probabilistic model to generate the determination. In other examples, a support vector machine or neural network can be used to combine results.

Speech-to-Text-Conversion Using a Repeat Utterance

If a repeat utterance is detected, then it is presumed that the text conversion of the original utterance was incorrect. Various techniques can be used to determine a text conversion based on the original utterance together with the repeat utterance, that is, to implement the step in Box 312 of FIG. 3, some examples of which are discussed below.

In some implementations, the server system 206, e.g., the speech recognizer 209, generates an output that includes a set of candidates and a probability corresponding to each candidate that the candidate is the correct text conversion of the utterance. That is, if the utterance is a single word, then the set of candidates can be a set of words and a probability for each word that it is the correct text conversion. Various techniques can be used to determine the candidates and the probabilities.

In an example implementation, the speech recognizer can include Hidden Markov Modeling (HMM) encoded in a finite state transducer (FST). A relevant language model is selected from the language models 211. The speech recognition is performed, i.e., the utterance is used by the speech recognizer 209 applying the selected language model to determine one or more candidate character strings from the utterance. A confidence level (e.g., a probability) can be associated with each character string. In some implementations, the confidence level or probability is a number between 0 and 1, with 0 being low confidence and 1 representing high confidence. As mentioned above, in some implementations, the user can be prompted to input a repeat utterance, e.g., if the confidence level of the text conversion of the original utterance is below a predetermined threshold.

A first set of candidates and corresponding first confidence levels are determined for the original utterance. A second set of candidates and corresponding second confidence levels are determined for the repeat utterance. In some implementations, for candidates that are included in both the first set of candidates and the second set of candidates, the first confidence level is multiplied by the second confidence level for each overlapping candidate, and a combined confidence level is determined. The overlapping candidates are ranked based on their combined confidence levels. In some implementations, the first confidence level and the second confidence level are given different weightings when combining into the combined confidence level. For example, the second confidence levels (i.e., the confidence levels corresponding to the repeat utterance) can be weighted more heavily than the first confidence levels, because it is already known that the top ranked candidate selected from the first set of candidates was the incorrect character string. In some implementations, weights are selected by optimization using a validation set. That is, the weights are adjusted to give the best results on a set of real examples, then those weights are used in the system.

The results can be ranked based on their confidence levels, i.e., the combined confidence levels for the overlapping candidates and the confidence levels determined based on the repeat utterance for the remaining candidates. The top ranked candidate or a set of top-n ranked candidates can be provided to the user. If one or more candidates are included in the ranked results that were previously presented to the user, i.e., as candidates in response to the original utterance, they can be withheld from presentation to the user as either the top ranked candidate or in the set of top-n ranked candidates, to avoid presenting the user with one or more candidates that they previously did not select, and presumably considered to be inaccurate.

Figure 5:
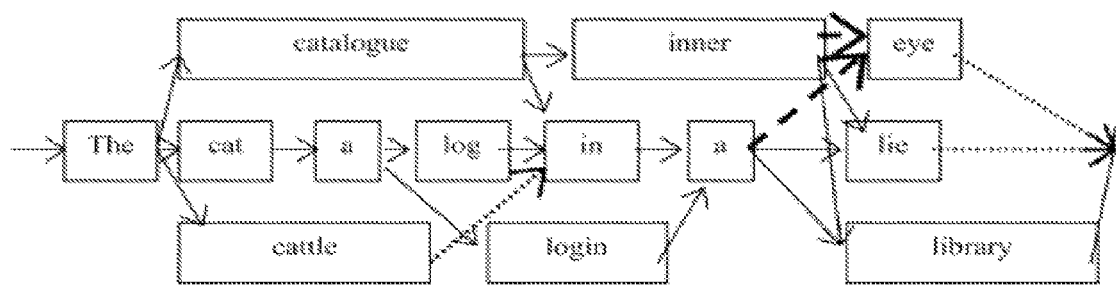
FIG. 5 shows an example word lattice for a multi-word utterance.

In some implementations, the speech recognizer 209 is configured to determine a word lattice corresponding to a speech utterance. FIG. 5 shows an example word lattice for a multi-word utterance. The word lattice includes several candidates character strings, including the following examples:

The catalogue inner eye
The catalogue inner lie
The catalogue inner library
The catalogue in a eye
The catalogue in a lie
The catalogue in a library
The cat a log in a lie
The cat a log in a eye
The cat a log in a library
The cat a login a library
The cat a login a lie
The cat a login a eye
The cattle in a lie
The cattle in a eye
The cattle in a library For each candidate character string in the word lattice, the speech recognizer 209 determines a confidence level (i.e., a probability) that the character string is the correct text conversion of the speech utterance. A word lattice can be determined using conventional techniques, for example, Hidden Markov Modeling.

In some implementations, a first lattice is determined that corresponds to the original utterance, where the speech recognizer 209 uses a first language model from the language models 211. Next, a second lattice is determined that corresponds to the repeat utterance, where the speech recognizer 209 uses the first language model (or a different language model) to determine the second lattice. Next, for character string candidates that occur in both the first lattice and the second lattice (i.e., overlapping candidates), the confidence level from the second lattice is multiplied by the confidence level from the first lattice to generate a combined confidence level. The first lattice is re-scored using the confidence levels corresponding to the second lattice to thereby generate a set of combined confidence levels for the first lattice. That is, an intersection or union of the first and second lattices is determined. Combined confidence levels for the overlapping candidates are determined from the intersection or union of the two lattices. Various techniques for determining the intersection or union of the two lattices can be used. The combined confidence levels can be used to select a top candidate or set of top-n candidates of character strings that correspond to the original and repeat utterances.

In some implementations, a first lattice is determined that corresponds to the original utterance, where the speech recognizer 209 uses a first language model from the language models 211. Next, a second lattice is determined that corresponds to the repeat utterance, where the speech recognizer 209 uses the first lattice as the language model to determined the second lattice. That is, if the correct text conversion is present in the first lattice, even though it may not have scored well when the first lattice was determined, by using the first lattice as the language model for the repeat utterance, the confidence level of the correct text conversion presumably is boosted in the confidence levels that correspond to the second lattice. This technique uses the acoustic features from the repeat utterance to effectively re-score the first lattice (i.e., because the first lattice is used as the language model). The confidence levels determined for the second lattice (i.e., the re-scored lattice) can be used to select a top candidate or set of top-n candidates of character strings that correspond to the original and repeat utterances.

In some implementations, the confidence levels that correspond to the second lattice can be combined with the confidence levels that correspond to the first lattice for overlapping candidates and the combined confidence levels can be used to determined the top candidate or set of top-n candidates. In one example, the confidence levels are combined by multiplying them together. In another example, the confidence levels are combined by using the confidence levels from the second lattice, but weighted using weights embedded in the first lattice. For example, a connector between two word nodes (e.g., the connector between "catalogue" and "inner" in the word lattice shown in FIG. 5) can have an assigned weight that can be used to adjust the confidence level determined based on the repeat utterance.

In some implementations, alignment of acoustic sequences of vectors that represent the original utterance and a second utterance can be used to determine a text conversion. As was discussed above, an alignment score between acoustic sequences of vectors that represent the original and second utterances can be used to determine whether the second utterance is a repeat utterance. If the second utterance is a repeat utterance, then the probability of a frame of the original utterance (e.g., frame(1,i)) and the probabilities of the one or more frames of the repeat utterance that align to the frame of original utterance (e.g., frame(2,j) . . . frame(2,j+k)) can be combined to provide a combined probability. For each frame of the original utterance, there can be zero or more such aligning frames of the repeat utterance, which can be determined using, for example, dynamic time warping.

A user may speak the repeat utterance in a more slow and deliberate manner than he/she spoke the original utterance, because the user wants to improve the speech-to-text conversion with the repeat attempt and believes that speaking more slowly and clearly will help. In some implementations, dynamic time warping can be used to find an alignment between the original utterance and the repeat utterance to take into account different speeds in vocalizing the two utterances.

Various techniques can be used to combine the probabilities of the corresponding frames, e.g., using the maximum probability, averaging the probabilities, determining a weighted average of the probabilities, etc. In some implementations, the probabilities from the two utterances can be weighted relative to each other based on, for example, an additional signal that is available that indicates their validity. For example, a noise or a speech energy model can indicate when one utterance includes background noise or is muffled, and that utterance can be de-weighted with respect to the other utterance, for all or some of the frames that correspond to the utterance.

Generally, some frames of the original utterance will align to some frames of the repeat utterance, but some frames will not align. An aligned sequence of vectors can be generated, where for each frame that aligns between a sequence relating to the original utterance and a sequence relating to the repeat utterance, a combined probability is determined. For each frame relating to the original utterance or the repeat utterance that does not align with a frame from the other utterance, a probability dependent on only that frame (i.e., for that utterance) can be determined. In the instance of partial alignments, frames from either utterance can be discarded.

In some instances, the repeat utterance may be a variation of the original utterance. For example, if the original utterance is "map of new york" and the repeat utterance is "directions to new york", then the aligned sequence of vectors will have "new york" aligned, but "map of" and "directions to" failing to align. Preferably, the utterance "directions to new york" is converted from speech-to-text using the "directions to" frames from the repeat utterance (and discarding the "map of" frames from the original utterance) and using the "new york" frames from both the original and repeat utterances. That is, the second spoken input is actually a repeat for only a portion of the input, in this example, the "new york" portion, and is therefore decoded accordingly.

In some implementations, a multi-stream HMM recognizer can be used to decode the original utterance and the repeat utterance at the same time. A multi-stream HMM is similar to a classical HMM with the particularity that each state contains not one, but several emission probability models, one for each stream, which are combined, for example, through a weighted product. Weights can be dynamically tied to stream reliability, for example, when environment conditions (e.g., signal to noise ratio) change, the weights can be adjusted to emphasize the most reliable modality. Using multi-stream HMM, the probabilities of the original and repeat utterances can be combined while they are being decoded. The results can be used to determine a top candidate or the top-n candidates for text conversion.

In some implementations, as was mentioned above, noise in one or both of signals representing the utterances can be detected. Weighting the probabilities of the two utterances can be based on the detected noise. For example, with respect to frames that are detected to include noise, the weighting for the corresponding utterance can be decreased, and the weighting can be applied piecemeal throughout the utterance. In some implementations, a simple speech model can be used to remove distortion before applying the speech recognizer. In one example, the ALGONQUIN technique is used to denoise speech features before applying the speech recognizer.

Various techniques are described above for using a repeat utterance together with the original utterance to provide improved text conversion. In some implementations, two or more of the techniques can be used in combination. For example, a multi-stream HMM can be used to generate a lattice.

Figure 4:
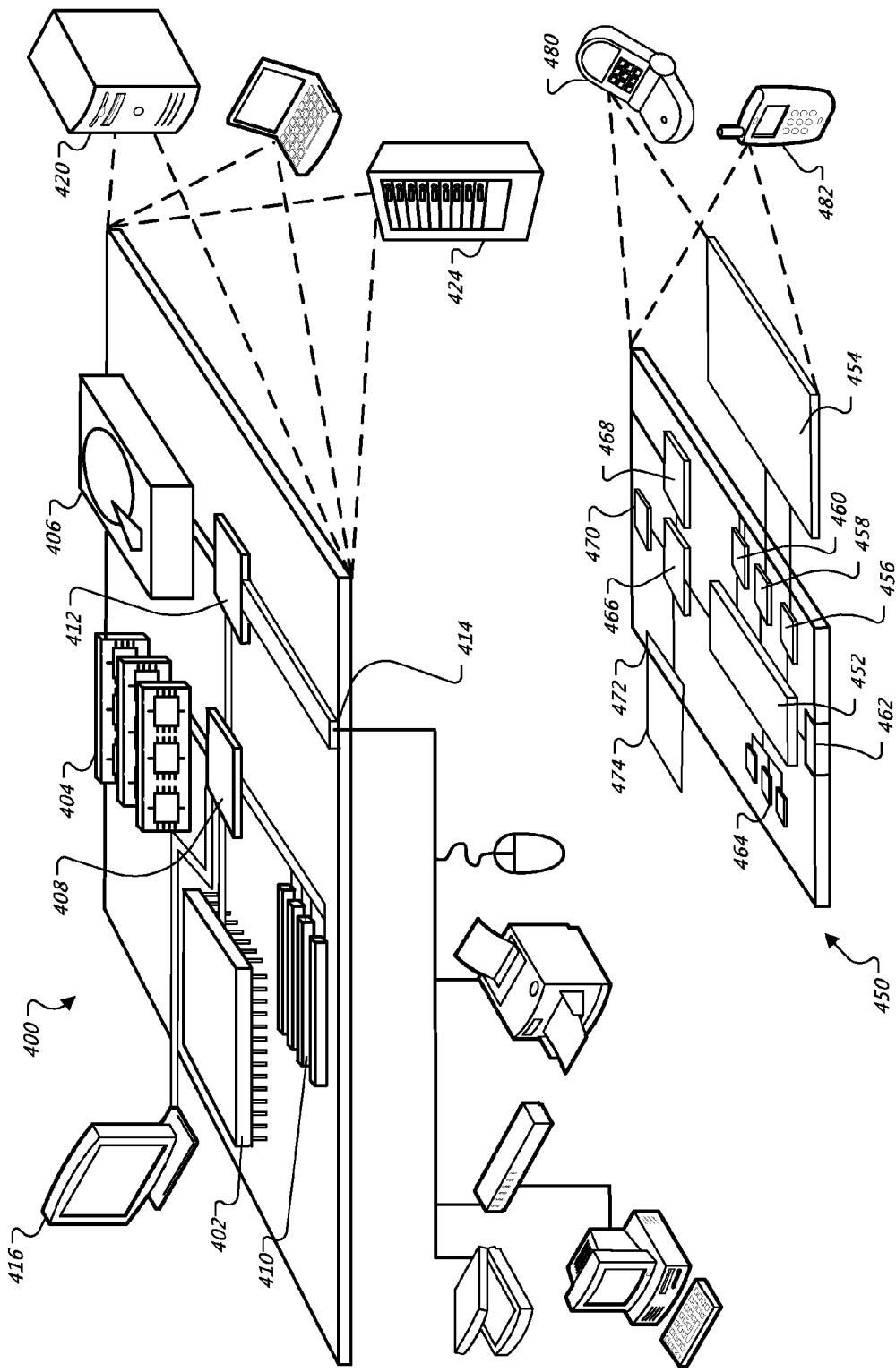
FIG. 4 shows examples of computer devices that may be used to execute the actions discussed in this document.

FIG. 4 shows an example of a computer device 400 and a mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various buses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 may execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 may be implemented as one or more of a computer-readable medium or media, a volatile memory unit or units, or a non-volatile memory unit or units. Expansion memory 474 may also be provided and connected to device 450 through expansion interface 472, which may include, for instance, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Device 450 may also include one or more different devices that are capable of sensing motion. Examples include, but are not limited to, accelerometers and compasses. Accelerometers and compasses, or other devices that are capable of detecting motion or position are available from any number of vendors and may sense motion in a variety of ways. For example, accelerometers may detect changes in acceleration while compasses may detect changes in orientation respective to the magnetic North or South Pole. These changes in motion may be detected by the device 450 and used to update the display of the respective devices 450 according to processes and techniques described herein.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of what is described here.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
   receiving, by a computing system and at a first time, a first spoken input from a user of an electronic device, the first spoken input comprising an original utterance by the user;
   based on the original utterance, determining, by the computing system, a first set of character string candidates wherein each character string candidate represents the first spoken input converted to textual characters, and wherein determining the first set of character string candidates comprises using a speech recognizer to determine a first word lattice that represents the first set of character string candidates and a first set of probabilities, each probability corresponding to a character string candidate;
   providing, for display to the user, a selection of one or more of the character string candidates in response to receiving the first spoken input;
   receiving, by the computing system and at a second time, a second spoken input from the user;
   determining, by the computing system, that the second spoken input is a repeat utterance of the original utterance;
   based on determining that the second spoken input is a repeat utterance of the original utterance, and using the original utterance and the repeat utterance, determining, by the computing system, a second set of character string candidates, wherein determining the second set of character string candidates using the original utterance and the repeat utterance comprises:
   using the speech recognizer and the first word lattice as a language model to determine a second word lattice that represents the second set of character string candidates and a second set of probabilities, each probability corresponding to a character string candidate of the second set of character string candidates;
   determining an intersection or union of the first word lattice and the second word lattice and, for each character string candidate included in the intersection or union, determining a combined probability based on the probabilities from the first set of probabilities and the second set of probabilities that correspond to the character string candidate; and
   determining a third set of character string candidates based on the intersection or union and the determined combined probabilities.

2. The method of claim 1, wherein determining that the second spoken input is a repeat utterance of the original utterance comprises determining that the second spoken input was received within a predetermined time period of the first time.

3. The method of claim 1, wherein determining that the second spoken input is a repeat utterance of the original utterance comprises generating a score that indicates an acoustic alignment between a first sequence of vectors that represents the first spoken input and a second sequence of vectors that represents the second spoken input and determining that the score exceeds a predetermined threshold score.

4. The method of claim 1, wherein determining that the second spoken input is a repeat utterance of the original utterance comprises determining whether the first and second inputs were spoken by different voices.

5. The method of claim 1, wherein determining the first word lattice and the second word lattice comprises using Hidden Markov Modeling.

6. The method of claim 1, wherein the determining a combined probability includes weighting the probabilities from the first word lattice and the probabilities from the second word lattice differently when combining the probabilities.

7. The method of claim 1, further comprising selecting for provision to the electronic device, a character string that is in the third set of character string candidates.

8. The method of claim 7, wherein the selected character string is determined to be a better match for one or more of the original and repeat utterances than other character strings that appear in the third set of character string candidates.

9. The method of claim 1, further comprising transmitting to the electronic device for selection by the user a list of one or more character strings that are determined to be present in the third set of character string candidates.

10. The method of claim 1, further comprising transmitting to the electronic device for selection by the user a list of one or more character strings that are determined to be present in the second set of character string candidates.

11. A computer-implemented method, comprising:
receiving, by a computing system and at a first time, a first spoken input from a user of an electronic device, the spoken input comprising an original utterance;
based on the original utterance, determining, by the computing system, a first set of character string candidates and a confidence level corresponding to each character string candidate in the set, wherein each character string candidate represents the first spoken input converted to text;
determining, by the computing system, that less than a threshold number of character string candidates in the set have a corresponding confidence level that meets or exceeds a predetermined threshold level and in response to the determination, requesting the user to provide a second spoken input;
determining, using a speech recognizer, a first word lattice that represents the first set of character string candidates and a first set of probabilities, each probability corresponding to a character string candidate in the first word lattice;
receiving, by the computing system and at a second time, the second spoken input from the user;
determining, by the computing system and using the speech recognizer and the first word lattice as a language model, a second word lattice that represents a second set of character string candidates and a second set of probabilities, each probability corresponding to a character string candidate in the first word lattice;
determining an intersection or union of the first word lattice and the second word lattice and, for each character string candidate included in the intersection or union, determining a combined probability based on the probabilities from the first set of probabilities and the second set of probabilities that correspond to the character string candidate;
determining a third set of character string candidates based on the intersection or union and the determined combined probabilities;
determining, by the computing system, a selection of one or more character string candidates from the third set of character string candidates; and
transmitting, by the computing system, the selection of one or more character string candidates to the electronic device for display to the user.

12. A non-transitory computer-readable medium having instructions encoded thereon, which, when executed by a processor, cause the processor to perform operations comprising:
receiving, at a first time, a first spoken input from a user of an electronic device, the first spoken input comprising an original utterance by the user;
based on the original utterance, determining a first set of character string candidates wherein each character string candidate represents the first spoken input converted to textual characters, and wherein determining the first set of character string candidates comprises using a speech recognizer to determine a first word lattice that represents the first set of character string candidates and a first set of probabilities, each probability corresponding to a character string candidate;
providing for display to the user a selection of one or more of the character string candidates in response to receiving the first spoken input;
receiving, at a second time, a second spoken input from the user;
determining that the second spoken input is a repeat utterance of the original utterance;
based on determining that the second spoken input is a repeat utterance of the original utterance, and using the original utterance and the repeat utterance, determining a second set of character string candidates, wherein determining the second set of character string candidates using the original utterance and the repeat utterance comprises:
using the speech recognizer and the first word lattice as a language model to determine a second word lattice that represents the second set of character string candidates and a second set of probabilities, each probability corresponding to a character string candidate of the second set of character string candidates;
determining an intersection or union of the first word lattice and the second word lattice and, for each character string candidate included in the intersection or union, determining a combined probability based on the probabilities from the first set of probabilities and the second set of probabilities that correspond to the character string candidate; and
determining a third set of character string candidates based on the intersection or union and the determined combined probabilities.

13. The non-transitory computer-readable medium of claim 12, wherein determining that the second spoken input is a repeat utterance of the original utterance comprises determining the second spoken input was received within a predetermined time period of the first time.

14. The non-transitory computer-readable medium of claim 12, wherein determining that the second spoken input is a repeat utterance of the original utterance comprises generating a score that indicates an acoustic alignment between a first sequence of vectors that represents the first spoken input and a second sequence of vectors that represents the second spoken input and determining that the score exceeds a predetermined threshold score.

15. The non-transitory computer-readable medium of claim 12, wherein determining that the second spoken input is a repeat utterance of the original utterance comprises determining whether the first and second inputs were spoken by different voices.

16. The non-transitory computer-readable medium of claim 12, further comprising instructions to cause the processor to perform operations comprising:
transmitting to the electronic device for selection by the user a list of one or more character strings that are determined to be present in the third set of character string candidates.

17. The non-transitory computer-readable medium of claim 12, further comprising instructions to cause the processor to perform operations comprising:

provided transmitting to the electronic device for selection by the user a list of one or more character strings that are determined to be present in the third set of character string candidates.

18. A system comprising:

one or more computers;

one or more data storage devices coupled to the one or more computers and storing instructions, which, when executed by the processor cause the one or more computers to perform operations comprising:

receiving, at a first time, a first spoken input from a user of an electronic device, the first spoken input comprising an original utterance by the user;

based on the original utterance, determining a first set of character string candidates wherein each character string candidate represents the first spoken input converted to textual characters, and wherein determining the first set of character string candidates comprises using a speech recognizer to determine a first word lattice that represents the first set of character string candidates and a first set of probabilities, each probability corresponding to a character string candidate;

providing for display to the user a selection of one or more of the character string candidates in response to receiving the first spoken input;

receiving, at a second time, a second spoken input from the user;

determining that the second spoken input is a repeat utterance of the original utterance;

based on determining that the second spoken input is a repeat utterance of the original utterance, and using the original utterance and the repeat utterance, determining a second set of character string candidates, wherein determining the second set of character string candidates using the original utterance and the repeat utterance comprises:

using the speech recognizer and the first word lattice as a language model to determine a second word lattice that represents the second set of character string candidates and a second set of probabilities, each probability corresponding to a character string candidate of the second set of character string candidates;

determining an intersection or union of the first word lattice and the second word lattice and, for each character string candidate included in the intersection or union, determining a combined probability based on the probabilities from the first set of probabilities and the second set of probabilities that correspond to the character string candidate; and determining a third set of character string candidates based on the intersection or union and the determined combined probabilities.

19. The system of claim 18, wherein determining that the second spoken input is a repeat utterance of the original utterance comprises determining that the second spoken input was received within a predetermined time period of the first time.

20. The system of claim 18, wherein determining that the second spoken input is a repeat utterance of the original utterance comprises generating a score that indicates an acoustic alignment between a first sequence of vectors that represents the first spoken input and a second sequence of vectors that represents the second spoken input and determining that the score exceeds a predetermined threshold score.

21. The system of claim 18, wherein determining that the second spoken input is a repeat utterance of the original utterance comprises determining whether the first and second inputs were spoken by different voices.

22. The system of claim 18, the instructions further comprising instructions to cause the processor to perform operations comprising:

transmitting to the electronic device for selection by the user a list of one or more character strings that are determined to be present in the third set of character string candidates.

23. The system of claim 18, the instructions further comprising instructions to cause the processor to perform operations comprising:

transmitting to the electronic device for selection by the user a list of one or more character strings that are determined to be present in the third set of character string candidates.

* * * * *